United States Patent
Hsueh et al.

(10) Patent No.: US 10,044,547 B2
(45) Date of Patent: Aug. 7, 2018

(54) DIGITAL CODE RECOVERY WITH PREAMBLE

(71) Applicant: TAIWAN SEMICONDUCTOR MANUFACTURING COMPANY, LTD., Hsinchu (TW)

(72) Inventors: Fu-Lung Hsueh, Kaohsiung (TW); William Wu Shen, Hsinchu (TW); Lan-Chou Cho, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/927,794

(22) Filed: Oct. 30, 2015

(65) Prior Publication Data

US 2017/0126462 A1 May 4, 2017

(51) Int. Cl.
*H03K 9/00* (2006.01)
*H04L 27/00* (2006.01)
*H04L 27/06* (2006.01)
*H04L 27/34* (2006.01)
*H04B 1/04* (2006.01)
*H04B 1/10* (2006.01)
*H04L 27/36* (2006.01)

(52) U.S. Cl.
CPC ....... *H04L 27/3405* (2013.01); *H04B 1/0475* (2013.01); *H04B 1/10* (2013.01); *H04L 27/0002* (2013.01); *H04L 27/362* (2013.01); *H04L 27/367* (2013.01); *H04L 27/34* (2013.01)

(58) Field of Classification Search
USPC ....... 375/219, 220, 221, 222, 229–236, 240, 375/240.26, 240.27, 240.29, 285, 284, 375/259, 316, 340, 344, 350, 349, 322, 375/324, 326, 327
See application file for complete search history.

(56) References Cited

U.S. PATENT DOCUMENTS

| | | | |
|---|---|---|---|
| 8,279,008 B2 | 10/2012 | Hsieh et al. | |
| 8,427,240 B2 | 4/2013 | Hsieh et al. | |
| 8,593,206 B2 | 11/2013 | Chen et al. | |
| 8,610,494 B1 | 12/2013 | Jin et al. | |
| 8,618,631 B2 | 12/2013 | Jin et al. | |
| 2001/0039491 A1* | 11/2001 | Yasunaga | G10L 19/12 704/223 |

(Continued)

*Primary Examiner* — Linda Wong
(74) *Attorney, Agent, or Firm* — Hauptman Ham, LLP

(57) ABSTRACT

A digital code recovery circuit includes a data transmitter that outputs either input data or a preamble code as transmitter data. A radio frequency interconnect (RFI) transmitter modulates carrier signals based on the transmitter data and transmits the modulated carrier signals over a channel to an RFI receiver that demodulates the carrier signals to obtain recovered transmitter data. A calibration storage device stores preamble data and a calibration circuit receives the recovered transmitter data. If the recovered transmitter data originated from the preamble code, the calibration circuit determines a set of digital calibration adjustments from the recovered transmitter data and the preamble data. If the recovered transmitter data originated from the input data, the calibration circuit applies the set of digital calibration adjustments to the recovered transmitter data to obtain adjusted digital code and outputs the adjusted digital code.

20 Claims, 6 Drawing Sheets

(56) References Cited

U.S. PATENT DOCUMENTS

| | | | |
|---|---|---|---|
| 2008/0101417 A1* | 5/2008 | Chapman | H04B 1/1027 370/497 |
| 2009/0175366 A1* | 7/2009 | Maltsev | H04B 7/0634 375/260 |
| 2011/0206171 A1* | 8/2011 | Wu | H04L 25/03057 375/350 |
| 2012/0082242 A1* | 4/2012 | Narroschke | H04N 19/423 375/240.25 |
| 2012/0092230 A1 | 4/2012 | Hung et al. | |
| 2013/0234305 A1 | 9/2013 | Lin et al. | |
| 2014/0098915 A1* | 4/2014 | Eliaz | H04L 25/03178 375/348 |
| 2014/0132333 A1 | 5/2014 | Jin et al. | |
| 2014/0217546 A1 | 8/2014 | Yen et al. | |
| 2014/0253262 A1 | 9/2014 | Hsieh et al. | |
| 2014/0253391 A1 | 9/2014 | Yen | |
| 2014/0329553 A1* | 11/2014 | Nakashima | H04W 52/365 455/522 |
| 2015/0256368 A1* | 9/2015 | Oettinger | H02J 7/025 320/108 |
| 2015/0341200 A1* | 11/2015 | bin Mohd Yussof | H04L 27/2628 370/204 |

* cited by examiner

DIGITAL CODE RECOVERY WITH PREAMBLE

BACKGROUND

Digital communications can include modulation, transmission, and demodulation of digital data over a radio frequency interconnect (RFI). A signal-to-noise ratio (SNR) is important to RFI performance, the degree of importance depending on the scheme used for modulation and demodulation of a transmitted signal. Because signal amplitude is a critical component of an SNR, information about signal amplitude is useful for improving RFI performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
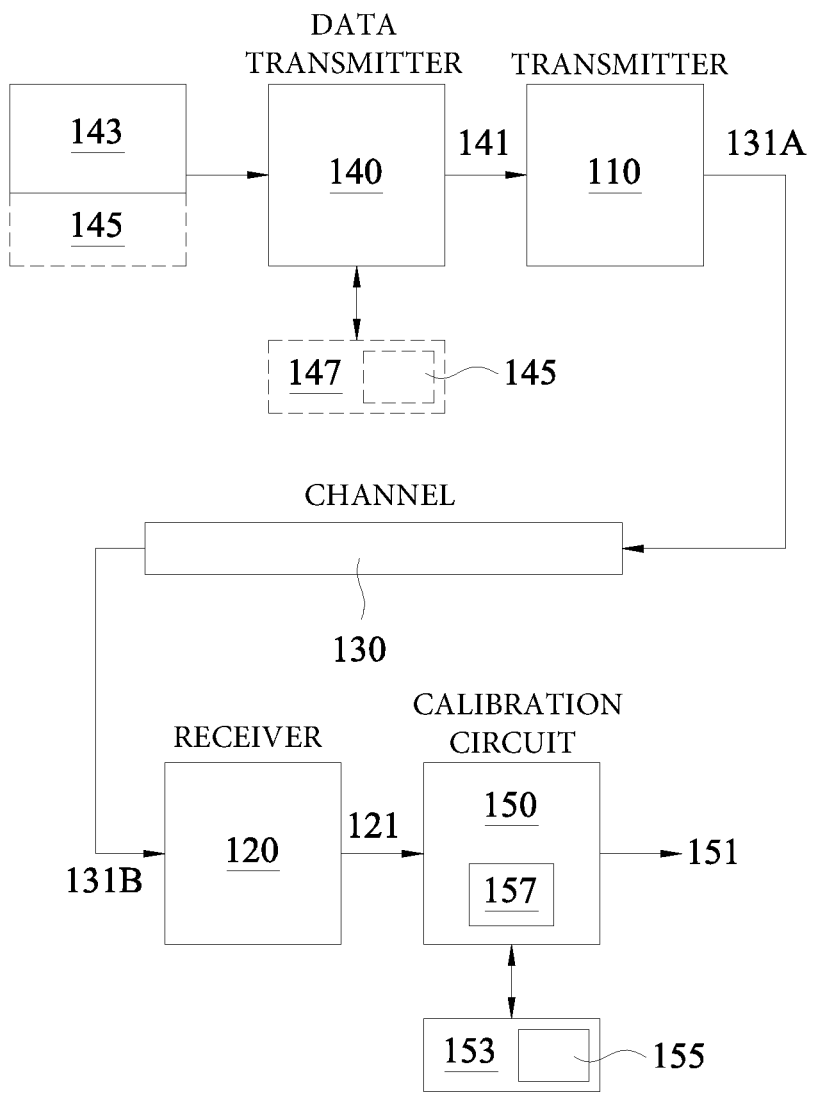
FIG. 1 is a schematic diagram of a digital code recovery circuit, in accordance with some embodiments.

The following disclosure provides different embodiments, or examples, for implementing features of the provided subject matter. Specific examples of components and arrangements are described below to simplify the present disclosure. These are, of course, merely examples and are not limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

A preamble code is used by a digital code recovery circuit to identify and compensate for transmission losses that affect signal amplitude. In a first step, a preamble code is transmitted from a data transmitter and received by a calibration circuit, which determines a set of digital calibration adjustments based on a recovered preamble code and stored preamble data. In a second step, the calibration circuit applies the set of digital calibration adjustments to data subsequently transmitted by the data transmitter, thereby generating adjusted digital code that compensates for the transmission losses.

FIG. 1 is a schematic diagram of a digital code recovery circuit 100, in accordance with some embodiments. Digital code recovery circuit 100 includes a transmitter 110 configured to transmit a plurality of modulated carrier signals 131A/B to a receiver 120 through a channel 130. A data transmitter 140 is configured to output transmitter data 141 to receiver 120. A calibration circuit 150 is configured to receive recovered transmitter data 121 from receiver 120 and output adjusted digital code 151 based on a set of digital calibration adjustments 157. Data transmitter 140 is configured to receive input data 143. In some embodiments, data transmitter 140 is configured to receive input data 143 together with a preamble code 145. In some embodiments, digital code recovery circuit 100 includes a transmitter storage device 147 connected to data transmitter 140 and configured to store preamble code 145. A calibration storage device 153 is connected to calibration circuit 150 and configured to store preamble data 155.

Transmitter 110 is configured to generate a plurality of carrier signals (not shown), modulate each signal of the plurality of carrier signals, and transmit the resultant plurality of modulated carrier signals 131A over channel 130. Transmitter 110 is configured to modulate each signal of the plurality of carrier signals based on transmitter data 141 received from data transmitter 140. In some embodiments, a number of carrier signals in the plurality of carrier signals equals a number of data bits of transmitter data 141 received from data transmitter 140.

Receiver 120 is configured to receive a plurality of modulated carrier signals 131B from channel 130, demodulate each signal of the plurality of modulated carrier signals 131B to obtain recovered transmitter data 121, and output recovered transmitter data 121. Receiver 120 is configured to generate a plurality of carrier signals (not shown) for demodulating each signal of the plurality of modulated carrier signals 131B. A number of carrier signals in the plurality of carrier signals equals the number of modulated carrier signals in the plurality of modulated carrier signals 131B Channel 130 is configured to propagate a plurality of modulated signals 131A/B from transmitter 110 to receiver 120. Channel 130 includes a transmission line. In some embodiments, channel 130 includes two transmission lines having a differential transmission line configuration.

In some embodiments, transmitter 110, receiver 120, and channel 130 are configured as a radio frequency interconnect (RFI) in which transmitter 110 is an RFI transmitter and receiver 120 is an RFI receiver. In some embodiments, transmitter 110, receiver 120, and channel 130 are configured as an RFI in which plurality of modulated signals 131A/B is propagated over channel 130 having a differential transmission line configuration.

Data transmitter 140 is configured to receive input data 143 and preamble code 145, and output transmitter data 141. Each of input data 143, preamble code 145, and transmitter data 141 is a digital code having N data bits. In some embodiments, digital code recovery circuit 100 includes transmitter storage device 147 configured to store preamble code 145, and data transmitter 140 is configured to receive preamble code 145 from transmitter storage device 147. In some embodiments, data transmitter 140 is configured to receive preamble code 145 together with input data 143.

In some embodiments, data transmitter 140 is configured to, in operation, output a single instance of transmitter data 141 including both input data 143 and preamble code 145. In some embodiments, data transmitter 140 is configured to, in operation, output a first instance of transmitter data 141 and a second instance of transmitter data 141 separate from the first instance of transmitter data 141, the first instance including only preamble code 145 and the second instance including input data 143 without preamble code 145.

Calibration circuit 150 is configured to receive recovered transmitter data 121 from receiver 120, determine the set of digital calibration adjustments 157, and output adjusted digital code 151 based on the set of digital calibration adjustments 157. Recovered transmitter data 121 includes data that originated from either preamble code 145 or input data 143. Calibration circuit 150 is configured to use recovered transmitter data 121 that originated from preamble code 145 to determine the set of digital calibration adjustments 157 and to apply the set of digital calibration adjustments 157 to recovered transmitter data 121 that originated from input data 143. In some embodiments, the set of digital calibration adjustments 157 comprises a plurality of adjustment values. In some embodiments, the set of digital calibration adjustments 157 comprises a single adjustment value.

Figure 2:
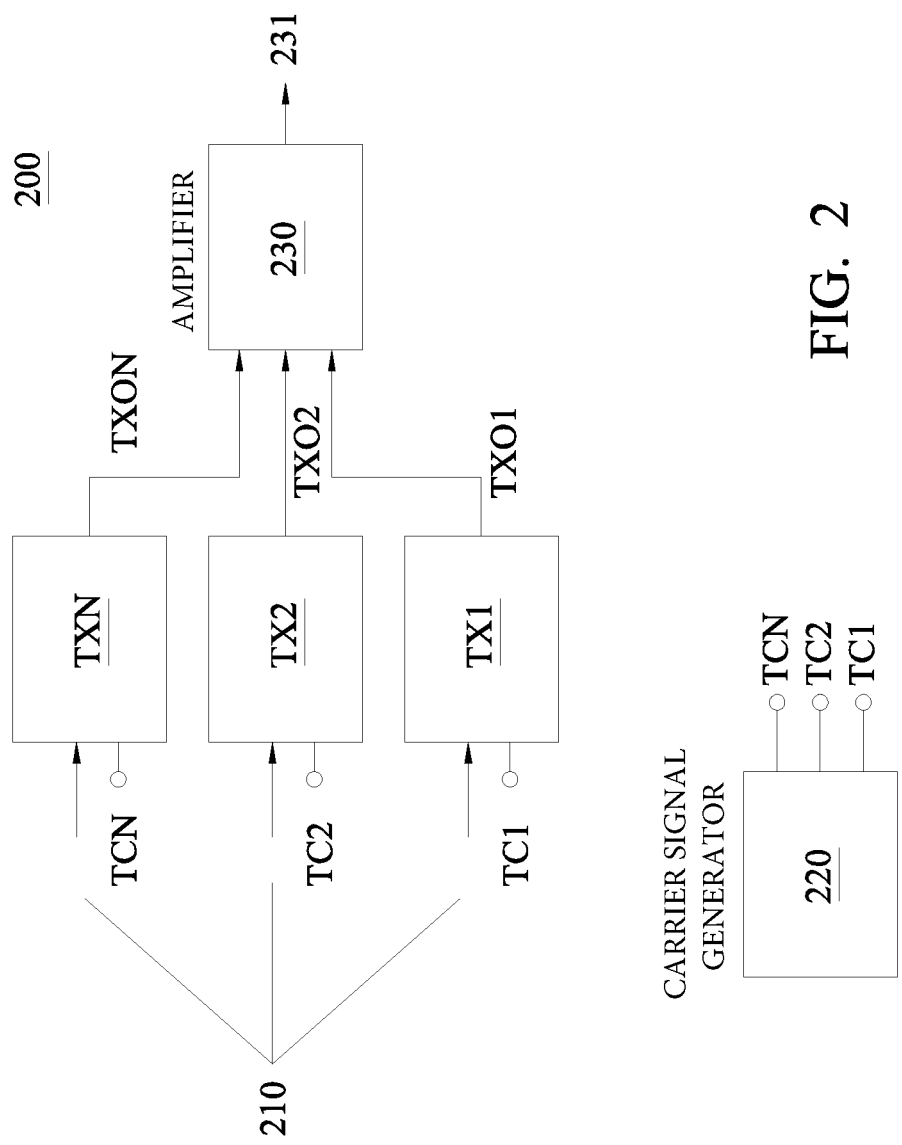
FIG. 2 is a schematic diagram of a transmitter, in accordance with some embodiments.

FIG. 2 is a schematic diagram of a transmitter 200 usable as transmitter 110 of digital code recovery circuit 100, in accordance with some embodiments. Transmitter 200 includes modulators TX1 . . . TXN configured to receive digital code 210 and carrier signals TC1 . . . TCN, and output modulated signals TXO1 . . . TXON. Transmitter 200 also includes a carrier signal generator 220 configured to generate carrier signals TC1 . . . TCN and an amplifier 230 configured to receive modulated signals TXO1 . . . TXON and output amplified signal 231. In some embodiments, digital code 210 is transmitter data 141 and amplified signal 231 is plurality of modulated signals 131A.

The Nth modulator of modulators TX1 . . . TXN is configured to receive nth bits of digital code 210 and an Nth carrier signal of carrier signals TC1 . . . TCN from carrier signal generator 220. The number of modulators N equals the number of data bits in digital code 210 and the number of carrier signals TC1 . . . TCN. In the example depicted in FIG. 2, N=3. In various embodiments, N is fewer than 3 or greater than 3.

Each modulator of modulators TX1 . . . TXN is configured to modulate a corresponding carrier signal of carrier signals TC1 . . . TCN with corresponding bits of digital code 210 to produce modulated signals TXO1 . . . TXON. In some embodiments, each modulator of modulators TX1 . . . TXN is configured to modulate the corresponding carrier signal of carrier signals TC1 . . . TCN using a quadrature amplitude modulation (QAM) scheme. In some embodiments, each modulator of modulators TX1 . . . TXN is configured to modulate the corresponding carrier signal of carrier signals TC1 . . . TCN using a 256 point QAM (256-QAM) scheme.

Amplifier 230 is configured to receive and amplify modulated signals TXO1 . . . TXON, and output the amplified differential signals as amplified signal 231. In some embodiments, amplifier 230 is configured to output amplified signal 231 on channel 130 of digital code recovery circuit 100.

Figure 3:
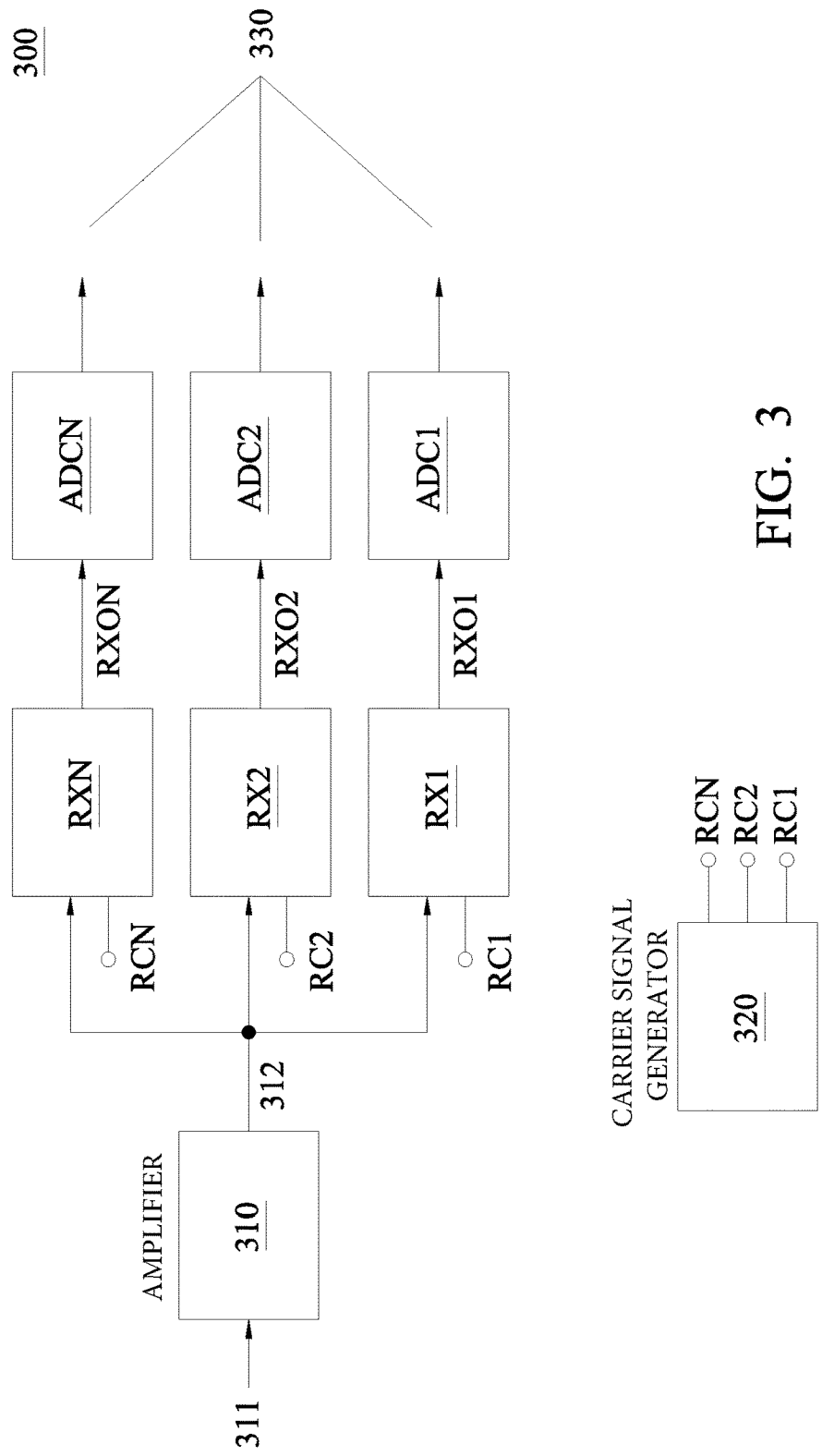
FIG. 3 is a schematic diagram of a receiver, in accordance with some embodiments.

FIG. 3 is a schematic diagram of a receiver 300 usable as receiver 120 of digital code recovery circuit 100, in accordance with some embodiments. Receiver 300 includes an amplifier 310 configured to receive input signal 311 and output amplified signal 312. A carrier signal generator 320 is configured to generate carrier signals RC1 . . . RCN and demodulators RX1 . . . RXN are configured to receive amplified signal 312 and carrier signals RC1 . . . RCN, and output demodulated signals RXO1 . . . RXON. Analog-to-digital converters ADC1 . . . ADCN are configured to receive demodulated signals RXO1 . . . RXON and output recovered code 330. In some embodiments, input signal 311 is plurality of modulated signals 131B and recovered code 330 is recovered transmitter data 121.

Input signal 311 includes N carrier signals modulated using an original digital code. In some embodiments, input signal 311 includes carrier signals modulated using digital code 210 of transmitter 200.

Amplifier 310 is configured to receive and amplify input signal 311 and output the amplified signal as amplified signal 312. In some embodiments, amplifier 310 is configured to receive input signal 311 from channel 130 of digital code recovery circuit 100.

The Nth demodulator of demodulators RX1 . . . RXN is configured to receive amplified signal 312 and an Nth carrier signal of carrier signals RC1 . . . RCN from carrier signal generator 320. The number of demodulators N equals the number of carrier signals RC1 . . . RCN. In the example depicted in FIG. 3, N=3. In various embodiments, N is fewer than 3 or greater than 3.

Each demodulator of demodulators RX1 . . . RXN is configured to demodulate a corresponding modulated carrier signal of amplified signal 312 and output a corresponding analog demodulated signal of demodulated signals RXO1 . . . RXON to a corresponding analog-to-digital converter (ADC) of ADCs ADC1 . . . ADCN. In some embodiments, each demodulator of demodulators RX1 . . . RXN is configured to demodulate the corresponding modulated carrier signal of amplified signal 312 using a quadrature amplitude demodulation (QAM) scheme. In some embodiments, each demodulator of demodulators RX1 . . . RXN is configured to demodulate the corresponding carrier signal of amplified signal 312 using a 256 point QAM (256-QAM) scheme.

ADCs ADC1 . . . ADCN are configured to convert corresponding analog demodulated signals RXO1 . . . RXON to digital recovered code 330. Based on the configurations of demodulators RX1 . . . RXN and ADCs ADC1 . . . ADCN, digital recovered code 330 is a recovered version of the original digital code used to modulate the N carrier signals of input signal 311. In some embodiments, ADCs ADC1 . . . ADCN are configured to provide recovered code 330 to calibration circuit 150 of digital code recovery circuit 100.

Figure 4:
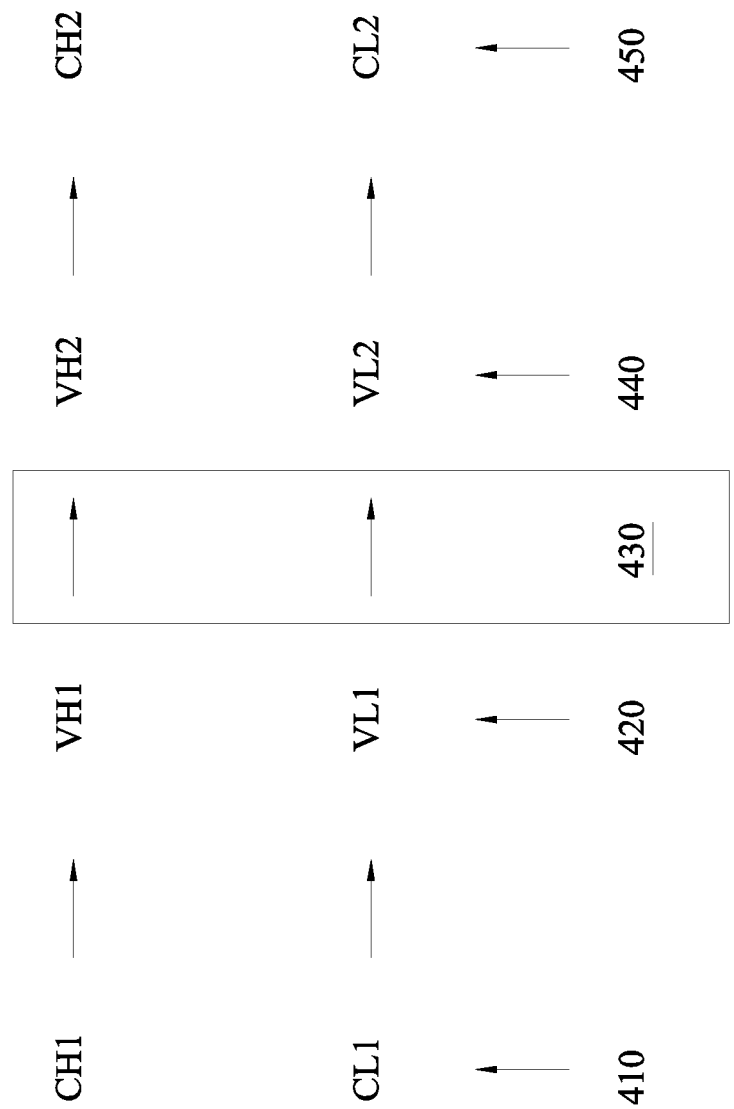
FIG. 4 is a diagram of a digital code transmission sequence, in accordance with some embodiments.

FIG. 4 is a diagram of a digital code transmission sequence, in accordance with some embodiments. A digital code 410 has a range of values from a first code low CL1 through a first code high CH1. In the transmission sequence depicted in FIG. 4, first code high CH1 is represented by a first highest voltage level VH1 in a transmitted signal 420, a second highest voltage level VH2 in a received signal 440, and is converted to a second code high CH2 in a recovered code 450. First code low CL1 is represented by a first lowest voltage level VL1 in the transmitted signal 420, a second lowest voltage level VL2 in received signal 440, and is converted to a second code low CL2 in recovered code 450. Transmitted signal 420 propagates through transmission medium 430 and is received as received signal 440.

First code low CL1 corresponds to digital code 410 having N bits in which all N bits have a value of zero. First code high CH1 corresponds to digital code 410 having N bits in which all N bits have a value of one. Digital code 410 having N bits has $2^N$ possible values, including first code low CL1 and first code high CH1.

In some embodiments, digital code 410 is transmitter data 141 of digital code recovery circuit 100. In some embodiments, digital code 410 is preamble code 145 of digital code recovery circuit 100.

Transmitted signal 420 having first lowest voltage level VL1 and first highest voltage level VH1 is transmitted through transmission medium 430 and received as received signal 440 having second lowest voltage level VL2 and second highest voltage level VH2. In some embodiments, transmitted signal 420 is a plurality of modulated carrier signals 131A of digital code recovery circuit 100, received signal 440 is a plurality of modulated carrier signals 131B of digital code recovery circuit 100, and transmission medium 430 is channel 130 of digital code recovery circuit 100.

Second code low CL2 of recovered code 450 is digitized from second lowest voltage level VL2 and second code high CH2 of recovered code 450 is digitized from second highest voltage VH2. In some embodiments, recovered code 450 is recovered transmitter data 121 of digital code recovery circuit 100.

As a result of propagating through transmission medium 430, transmitted signal 420 is distorted before being received as received signal 440. Transmission medium 430 has a frequency response that affects signal distortion. In some embodiments, transmission medium 430 acts as a signal attenuator and has a frequency response such that high frequencies are attenuated more than low frequencies.

Because of signal distortion, second lowest voltage level VL2 is higher than first lowest voltage level VL1, in some embodiments. In some embodiments, because of signal distortion, second highest voltage level VH2 is lower than first highest voltage level VH1.

Because second code low CL2 is digitized from second lowest voltage level VL2, if second lowest voltage level VL2 is not equal to first lowest voltage level VL1, then second code low CL2 differs from first code low CL1 corresponding to first lowest voltage level VL1. Because second code high CH2 is digitized from second highest voltage VH2, if second highest voltage level VH2 is not equal to first highest voltage level VH1, then second code high CH2 differs from first code high CH1 corresponding to first highest voltage level VH1.

In some embodiments, digital code 410 is preamble code 145 of digital code recovery circuit 100, and a set of digital calibration adjustments is determined from recovered code 450 and preamble code 145. In some embodiments, calibration circuit 150 of digital code recovery circuit 100 is configured to determine the set of digital calibration adjustments 157 from recovered code 450 and preamble code 145.

An offset value is defined as the difference between first code low CL1 and second code low CL2, given by $$\text{Offset value} = CL2 - CL1 \quad (1)$$

In some embodiments, CL1 is equal to zero and the offset value is equal to CL2.

For digital code 410 having N bits of data, a digital scaling factor (DSF) is defined as the ratio of the span of digital code 410 to the span of recovered code 450, given by $$DSF = 2^N / (CH2 - CL2) \quad (2)$$

In some embodiments, CL2 is equal to zero and the DSF simplifies to $2^N/CH2$.

In some embodiments, the offset value and DSF are the set of digital calibration adjustments 157 of digital code recovery circuit 100 and calibration circuit 150 is configured to determine the offset value and DSF.

In some embodiments, digital code 410 is input data 143 of digital code recovery circuit 100, the offset value and DSF are the set of digital calibration adjustments 157, and calibration circuit 150 is configured to apply the set of digital calibration adjustments 157 to recovered code 450 in two steps. In a first step, in some embodiments, the offset value is subtracted from recovered code 450 to obtain offset-corrected data. In a second step, in some embodiments, the offset-corrected data are multiplied with the DSF to obtain adjusted digital code.

By applying a set of digital calibration adjustments such as the example set of digital calibration adjustments described above with respect to Equations (1) and (2) to recovered code 450, the resultant adjusted digital code compensates for distortion of transmitted signal 420.

Figure 5:
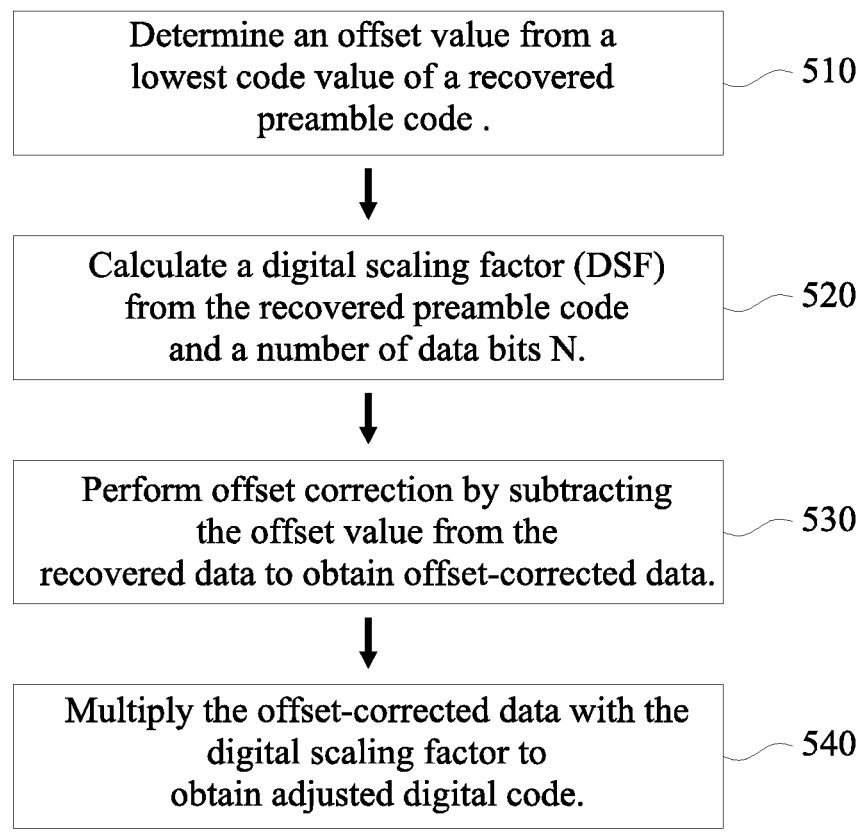
FIG. 5 is a flow chart of a method of applying a set of digital calibration adjustments, in accordance with some embodiments.

FIG. 5 is a flow chart of a method 500 of applying a set of digital calibration adjustments, in accordance with some embodiments. Method 500 is usable in conjunction with a calibration circuit, e.g. calibration circuit 150.

Method 500 starts at operation 510, in which an offset value is determined from a lowest code value of a recovered preamble code. In some embodiments, the offset value is determined using Equation (1). In some embodiments, the recovered preamble code is based on preamble code 145. In some embodiments, the preamble code has a lowest code value of zero and the offset value is equal to the lowest code value of the recovered preamble code.

Method 500 continues at operation 520, in which a digital scaling factor is calculated from the recovered preamble code and a number of data bits N. In some embodiments, the digital scaling factor is determined using Equation (2). In some embodiments, the recovered preamble code is recovered data 121 of digital code recovery circuit 100 that originated from preamble code 145.

Method 500 continues at operation 530, in which an offset correction is performed by subtracting the offset value from recovered data to obtain offset-corrected data. In some embodiments, the recovered data are recovered data 121 of digital code recovery circuit 100 that originated from input data 143. In some embodiments, the offset value is zero and the offset-corrected data are identical to the recovered data.

Method 500 continues at operation 540, in which the offset-corrected data are multiplied with the digital scaling factor to obtain adjusted digital code. In some embodiments, the adjusted digital code is adjusted digital code 151 of digital code recovery circuit 100.

Figure 6:
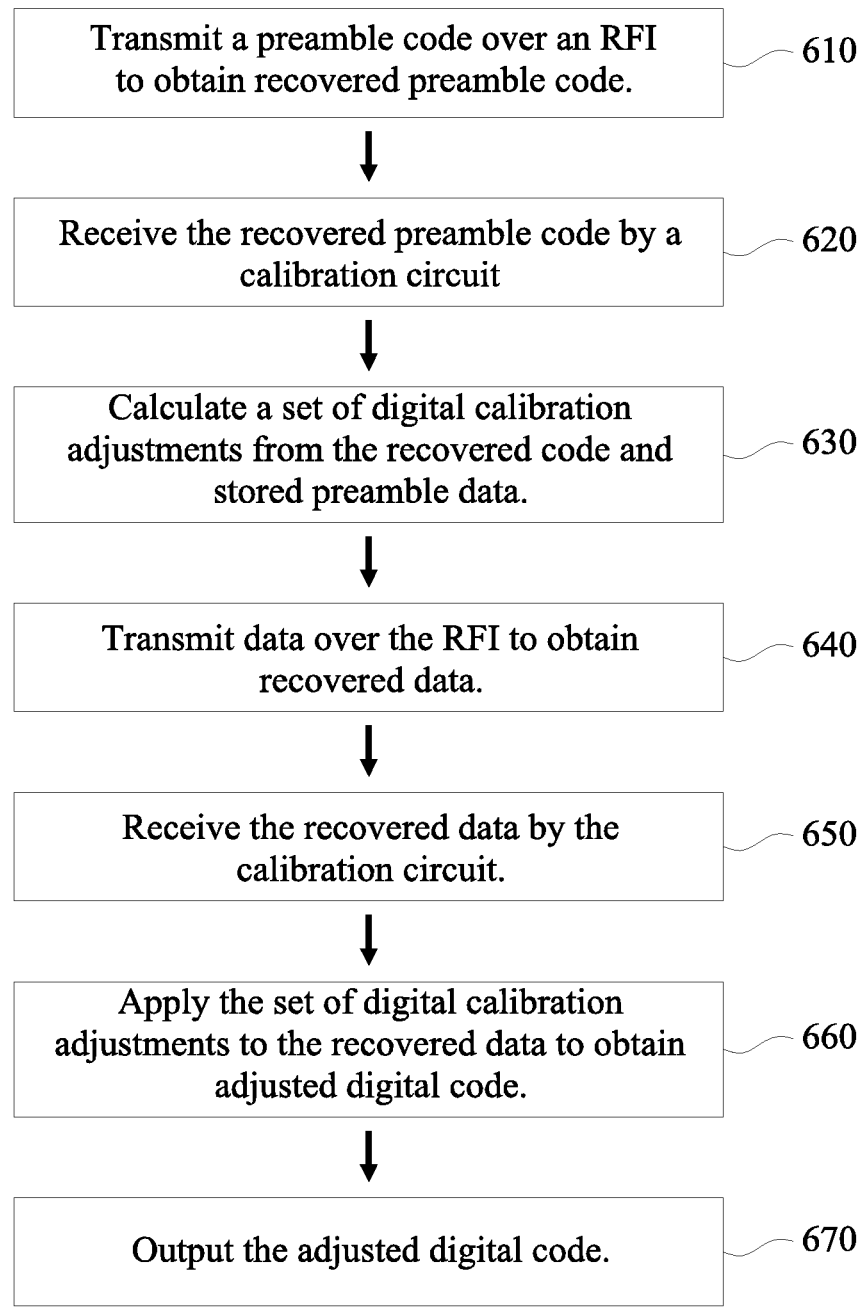
FIG. 6 is a flow chart of a method of transmitting data, in accordance with some embodiments.

FIG. 6 is a flow chart of a method 600 of transmitting data, in accordance with some embodiments. Method 600 is usable in conjunction with a digital code recovery circuit, e.g. digital code recovery circuit 100.

Method 600 starts at operation 610, in which a preamble code is transmitted over an RFI to obtain recovered preamble code. In some embodiments, the preamble code is preamble code 145 of digital code recovery circuit 100. In some embodiments, transmitting the preamble code is part of a continuous transmission of the preamble code together with additional transmission data. In some embodiments, transmitting the preamble code is separate from transmitting additional transmission data.

In some embodiments, operation 610 includes generating a plurality of carrier signals, modulating each carrier signal of the plurality of carrier signals based on the preamble code, and demodulating each modulated carrier signal. In some embodiments, modulating each carrier signal and demodulating each modulated carrier signal is performed using a QAM scheme. In some embodiments, modulating each carrier signal and demodulating each modulated carrier signal is performed using a 256 point QAM scheme.

In some embodiments, the preamble code is transmitted using transmitter 200 described above with respect to FIG.

2. In some embodiments, the preamble code is received and recovered by receiver 300 described above with respect to FIG. 3.

Method 600 continues at operation 620, in which the recovered preamble code is received by a calibration circuit. In some embodiments, the calibration circuit is calibration circuit 150 of digital code recovery circuit 100.

Method 600 continues at operation 630, in which a set of digital calibration adjustments is calculated by the calibration circuit from the recovered preamble code and stored preamble data. In some embodiments, the set of digital calibration adjustments is the set of digital calibration adjustments 157 of digital code recovery circuit 100. In some embodiments, operation 630 is performed as operations 510 and 520 of method 500, described above with respect to FIG. 5.

Method 600 continues at operation 640, in which data are transmitted over the RFI. In some embodiments, the data are transmitter data 141 of digital code recovery circuit 100 that originated from input data 143. In some embodiments, transmitting the data is part of a continuous transmission of the preamble code together with the data. In some embodiments, transmitting the data is separate from transmitting the preamble code.

In some embodiments, operation 640 includes generating a plurality of carrier signals, modulating each carrier signal of the plurality of carrier signals based on the data, and demodulating each modulated carrier signal. In some embodiments, modulating each carrier signal and demodulating each modulated carrier signal is performed using a QAM scheme. In some embodiments, modulating each carrier signal and demodulating each modulated carrier signal is performed using a 256 point QAM scheme.

In some embodiments, the data are transmitted using transmitter 200 described above with respect to FIG. 2. In some embodiments, the data received and recovered by receiver 300 described above with respect to FIG. 3.

Method 600 continues at operation 650, in which recovered data are received by the calibration circuit. In some embodiments, the recovered data are recovered data 121 of digital code recovery circuit 100.

Method 600 continues at operation 660, in which the set of digital calibration adjustments is applied to the recovered data to obtain adjusted digital code. In some embodiments, the adjusted digital code is adjusted digital code 151 of digital code recovery circuit 100. In some embodiments, operation 660 is performed as operations 530 and 540 of method 500, described above with respect to FIG. 5.

Method 600 ends at operation 670, in which the adjusted digital code is output.

One aspect of this description relates to a digital code recovery circuit. A digital code recovery circuit includes a data transmitter configured to receive input data and a preamble code and to output one or both of the input data and the preamble code as transmitter data. A radio frequency interconnect (RFI) transmitter is configured to generate a plurality of modulated carrier signals based on the transmitter data and transmit the plurality of modulated carrier signals over a channel and an RFI receiver is configured to receive the plurality of modulated carrier signals from the channel, demodulate the plurality of modulated carrier signals to obtain recovered transmitter data, and output the recovered transmitter data. A calibration storage device stores preamble data and a calibration circuit is configured to receive the recovered transmitter data. If the recovered transmitter data originated from the preamble code, the calibration circuit is configured to determine a set of digital calibration adjustments from the recovered transmitter data and the preamble data. If the recovered transmitter data originated from the input data, the calibration circuit is configured to apply the set of digital calibration adjustments to the recovered transmitter data to obtain adjusted digital code and to output the adjusted digital code.

Another aspect of this description relates to a method of transmitting data comprising transmitting a preamble code over a radio frequency interconnect (RFI) and receiving, by a calibration circuit, a recovered version of the preamble code. The calibration circuit determines a set of digital calibration adjustments from the recovered version of the preamble code and stored preamble data. The method further comprises transmitting data over the RFI, receiving, by the calibration circuit, a recovered version of the data, and applying, by the calibration circuit, the set of digital calibration adjustments to the recovered version of the data to obtain adjusted digital code.

Still another aspect of this description relates to a method of transmitting data comprising transmitting a preamble code over a radio frequency interconnect (RFI) and receiving, by a calibration circuit, a recovered version of the preamble code. The calibration circuit determines an offset value from the recovered version of the preamble code and stored preamble data and calculates a digital scaling factor from the recovered version of the preamble code and the stored preamble data. The method further comprises transmitting data over the RFI, receiving, by the calibration circuit, a recovered version of the data, subtracting, by the calibration circuit, the offset value from the recovered version of the data to obtain offset-corrected data, and multiplying, by the calibration circuit, the offset-corrected data with the digital scaling factor to obtain adjusted digital code.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A digital code recovery circuit, comprising:
  a data transmitter configured to receive input data and a preamble code and to output one or both of the input data and the preamble code as transmitter data;
  a radio frequency interconnect (RFI) transmitter configured to generate a plurality of modulated carrier signals based on the transmitter data and transmit the plurality of modulated carrier signals over a transmission line;
  an RFI receiver configured to receive the plurality of modulated carrier signals from the transmission line, demodulate the plurality of modulated carrier signals to obtain recovered transmitter data, and output the recovered transmitter data;
  a calibration storage device storing preamble data; and
  a calibration circuit configured to:
    receive the recovered transmitter data;
    when the recovered transmitter data originated from the preamble code, determine a set of digital calibration adjustments by analyzing a highest code value of the recovered version of the preamble code relative to a lowest code value of the recovered transmitter data and relative to the preamble data; and when the recovered transmitter data originated from the input data, apply the set of digital calibration adjustments to the recovered transmitter data to obtain adjusted digital code, and output the adjusted digital code.

2. The digital code recovery circuit of claim 1, further comprising a transmitter storage device configured to store the preamble code, wherein the data transmitter is further configured to receive the preamble code from the transmitter storage device.

3. The digital code recovery circuit of claim 1, wherein the data transmitter is further configured to receive the input data together with the preamble code.

4. The digital code recovery circuit of claim 1, wherein the calibration circuit is further configured to determine the set of digital calibration adjustments by:

setting an offset value to the lowest code value of the recovered transmitter data from the preamble code; and calculating a digital scaling factor from the lowest code value of the recovered transmitter data from the preamble code and the highest code value of the recovered transmitter data from the preamble code.

5. The digital code recovery circuit of claim 4, wherein the calibration circuit is further configured to apply the set of digital calibration adjustments to the recovered transmitter data from the input data by:

subtracting the offset value from the recovered transmitter data to obtain offset-corrected data; and multiplying the offset-corrected data with the digital scaling factor to obtain the adjusted digital code.

6. The digital code recovery circuit of claim 1, wherein the preamble data is the preamble code.

7. The digital code recovery circuit of claim 1, wherein the preamble data is an identifier for the preamble code.

8. The digital code recovery circuit of claim 1, wherein the transmission line is a differential transmission line and each of the RFI transmitter and the RFI receiver comprises a carrier signal generator configured to generate a plurality of carrier signals used to generate the plurality of modulated carrier signals, wherein a number of carrier signals equals a number of bits of the transmitter data.

9. The digital code recovery circuit of claim 8, wherein:

the RFI transmitter further comprises a plurality of modulators, each modulator of the plurality of modulators configured to modulate a corresponding carrier signal of the plurality of carrier signals using a quadrature amplitude modulation (QAM) scheme; and the RFI receiver further comprises a plurality of demodulators, each demodulator of the plurality of demodulators configured to demodulate a corresponding carrier signal of the plurality of carrier signals using the QAM scheme.

10. The digital code recovery circuit of claim 9, wherein the QAM scheme is a 256 point QAM scheme.

11. A method of transmitting data, the method comprising:

transmitting a preamble code over a transmission line of a radio frequency interconnect (RFI);

receiving, by a calibration circuit, a recovered version of the preamble code;

determining, by the calibration circuit, a set of digital calibration adjustments by analyzing a highest code value of the recovered version of the preamble code relative to a lowest code value of the recovered version of the preamble code and relative to stored preamble data;

transmitting data over the transmission line of the RFI;

receiving, by the calibration circuit, a recovered version of the data; and applying, by the calibration circuit, the set of digital calibration adjustments to the recovered version of the data to compensate for a signal loss from the transmission line and thereby obtain adjusted digital code.

12. The method of claim 11, further comprising outputting, by the calibration circuit, the adjusted digital code.

13. The method of claim 11, wherein transmitting the preamble code and transmitting the data are part of a continuous transmission sequence.

14. The method of claim 11, wherein transmitting the preamble code is separate from transmitting the data.

15. The method of claim 11, further comprising:

generating, by an RFI transmitter, a plurality of carrier signals;

modulating, by the RFI transmitter, each carrier signal of the plurality of carrier signals based on the preamble code; and demodulating, by an RFI receiver, each modulated carrier signal of the first plurality of carrier signals to obtain the recovered version of the preamble code.

16. The method of claim 15, wherein the modulating each carrier signal of the plurality of carrier signals and the demodulating each carrier signal of the plurality of carrier signals are performed using a quadrature amplitude modulation (QAM) scheme.

17. A method of transmitting data, the method comprising:

transmitting a preamble code over a radio frequency interconnect (RFI);

receiving, by a calibration circuit, a recovered version of the preamble code;

determining, by the calibration circuit, an offset value from the recovered version of the preamble code and stored preamble data;

calculating, by the calibration circuit, a digital scaling factor from the recovered version of the preamble code and the stored preamble data;

transmitting data over the RFI;

receiving, by the calibration circuit, a recovered version of the data;

subtracting, by the calibration circuit, the offset value from the recovered version of the data to obtain offset-corrected data; and multiplying, by the calibration circuit, the offset-corrected data with the digital scaling factor to obtain adjusted digital code.

18. The method of claim 17, further comprising outputting the adjusted digital code.

19. The method of claim 17, wherein determining the offset value comprises setting the offset value to a lowest code value of the recovered version of the preamble code.

20. The method of claim 17, wherein calculating the digital scaling factor comprises dividing a range of the preamble code by a difference between a highest code value of the recovered version of the preamble code and a lowest code value of the recovered version of the preamble code.

* * * * *